April 27, 1954

F. AUTENRIETH 2,676,693

TRANSFER MECHANISM

Filed Jan. 30, 1951

INVENTOR
Ferdinand Autenrieth
BY
Duell and Kane
ATTORNEYS

April 27, 1954 F. AUTENRIETH 2,676,693
TRANSFER MECHANISM
Filed Jan. 30, 1951 3 Sheets-Sheet 2

INVENTOR
Ferdinand Autenrieth
BY Duell and Kane
ATTORNEYS

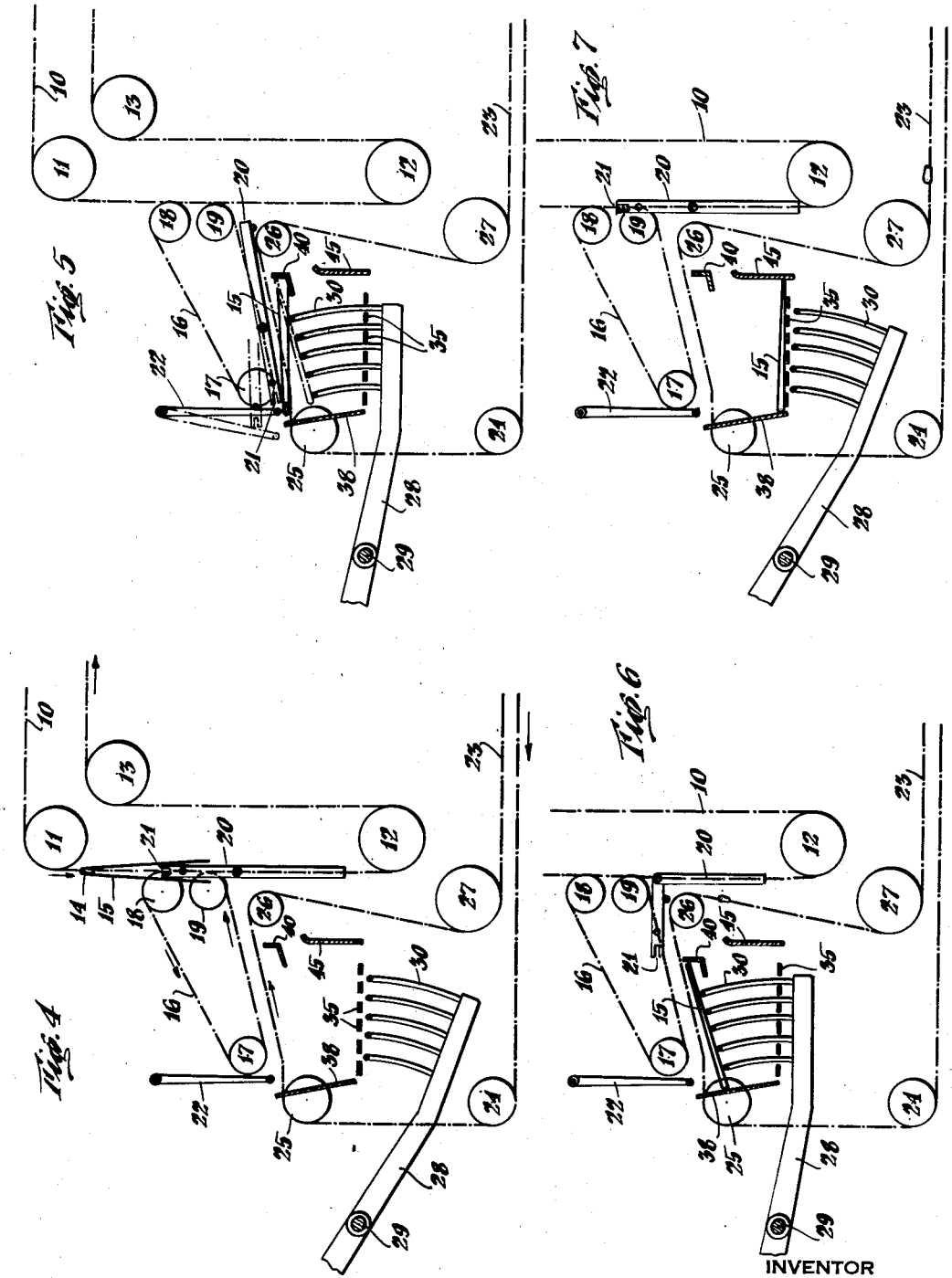

Patented Apr. 27, 1954

2,676,693

UNITED STATES PATENT OFFICE 2,676,693

TRANSFER MECHANISM

Ferdinand Autenrieth, Irvington, N. J., assignor to C. F. Mueller Company, Jersey City, N. J., a corporation of Delaware Application January 30, 1951, Serial No. 208,645

16 Claims. (Cl. 198—27)

This invention relates to a structurally and functionally improved transfer mechanism primarily intended for use with food products such as spaghetti, macaroni, noodles, etc.; the present application being a continuation in part of my prior United States application for patent of April 18, 1950, identified under Serial Number 156,667.

It is an object of the invention to provide a mechanism of this nature and by means of which food products will be transferred in their entirely from a dryer or similar machine to a conveyor moving, for example, to packaging apparatus. Moreover, by means of the present invention, all transferred products will be properly disposed. Therefore, wastage will be reduced to a minimum.

A further object is that of furnishing a mechanism which will function automatically and with a minimum of manual adjustment or supervision; the mechanism being capable of operating at relatively high speed and with maximum efficiency.

With these and other objects in mind, reference is had to the attached sheets of drawings illustrating one practical embodiment of the invention and in which:

Figs. 4, 5, 6 and 7 are somewhat diagrammatic representations of the apparatus and showing the sequential steps for shiftings of the same during one complete cycle of operation.

Figure 1:
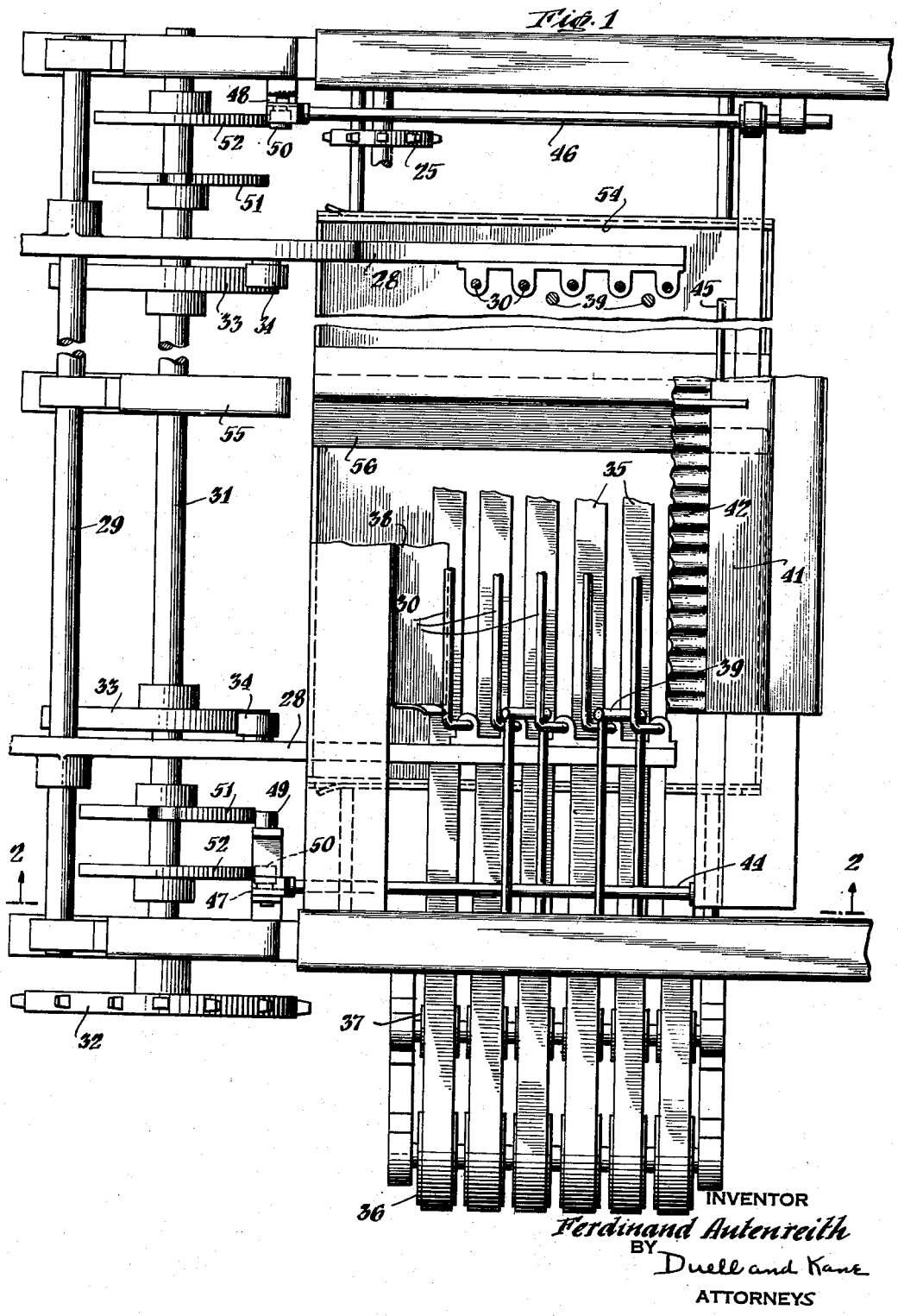
Fig. 1 is a fragmentary plan view with certain of the parts broken away to disclose underlying constructions.

Referring primarily to Fig. 4, the reference numeral 10 indicates a conveyor which may conveniently be in the form of a pair of spaced chains moving in the direction of the arrows and passing over sprockets 11, 12 and 13. The vertical course of this conveyor defined between sprockets 11 and 12 is preferably disposed adjacent the delivery end of a dryer or oven (not shown). The conveyor will mount supports which receive the ends of bars 14. It is over the latter that the goods indicated at 15 are draped; the crotch portions of the macaroni, spaghetti, etc. being in contact with the bars 14.

Extending to overlap or lie adjacent the course of conveyor 10 between sprockets 11 and 12, is a second conveyor 16. The latter may also be formed by a pair of spaced sprocket chains moving over sprockets 18, 17 and 19. Both conveyors 10 and 16 are driven by suitable power sources which have not been illustrated. A transfer member 20 is connected to conveyor 16. This member preferably embraces a pair of units each including an upper portion which is notched as at 21 to receive the ends of bar 14, and a lower leg portion pivotally secured to that upper portion. This leg portion may be swung in one direction with respect to the upper portion. However, stops or shoulders prevent it moving beyond a position co-extensive with that upper portion when it is swung in an opposite direction. A latch element 22 may be disposed adjacent the outer end of conveyor 16. A third conveyor 23 again conveniently embodying a pair of spaced sprocket chains passes in the direction indicated by arrows over guiding sprockets 24, 25, 26 and 27. As will be noted, this conveyor has its upper course extending adjacent the lower course of conveyor 16. The purpose of conveyor 23 is that of receiving the bars 14 after the goods 15 have been freed therefrom and in transferring these bars conveniently to the forward end of the main oven or dryer where they may again receive additional goods to be processed. This has been fully described and the structures of the several units have been adequately illustrated in the application for patent in my name as afore-identified.

Figure 2:
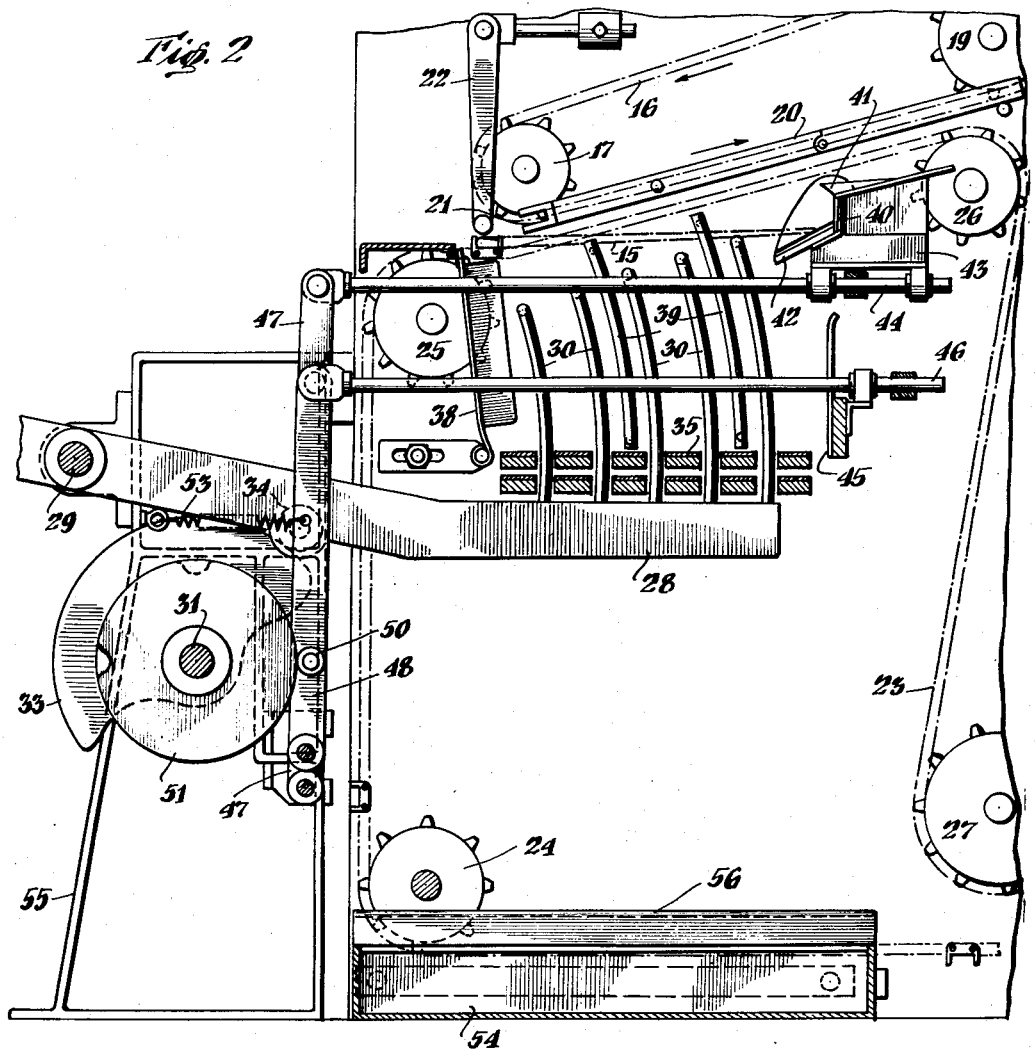
Fig. 2 is a sectional side view taken along the lines 2—2 and in the direction of the arrows as indicated in Fig. 1.

As also shown in that application and herein illustrated in detail in Figs. 1 and 2, bars 28 are mounted for rocking movement around the axis of a shaft 29. These bars are spaced and support between them a series of rods 30 which have central horizontally extending portions and downwardly extending leg portions at their ends. The lower parts of these leg portions are connected to bars 28. The length of the leg portions increases towards the dryer. Therefore a generally inclined supporting surface is defined by their upper horizontally extending portions. A power shaft 31 conveniently driven by a sprocket 32 carries cams 33. The latter have their peripheries in engagement with followers 34 carried one by each of the bars 28. These bars may be counterweighted as described in the previous case. In any event, it will be apparent that as shaft 31 rotates bars 28 will be periodically raised and lowered to correspondingly move rods 30.

Intervening the spaces between these rods are conveyor strips or belts 35. As shown in Fig. 1, these belts conveniently pass over pulleys 36 and guide pulleys 37 suitably supported by the machine. As viewed in Fig. 1 their upper courses move in an upward direction. They extend materially beyond the illustrated portions of the apparatus and, as taught in the previous application, may pass adjacent saws or severing mechanisms which serve to trim the goods supported upon the upper course of belts 35. In any event they preferably move towards packaging machinery.

Beyond the support defined by the horizontal rod portions 30 a shield 38 may be disposed. To each side of the rod series 30 stationary rods 39 may be provided and which function as guides to prevent a displacement of the goods. Inward of the series of rods 30 a pair of registration mechanisms may be furnished. These are disposed in different horizontal planes. The uppermost of the same conveniently include a shield 40 presenting adjacent its upper and lower edges outwardly extending portions 41 and 42 respectively. This shield is mounted upon a support 43 carried by a rod 44 which is mounted for sliding movement.

The second registration assembly conveniently includes a plate 45 having its lower edge extending substantially into the plane of the upper course of conveyor belts 35. This plate is also supported upon a rod 46 mounted for sliding movements in suitable guides. Both rods 44 and 46 are periodically shifted by having their outer ends pivotally connected one to each of levers 47 and 48. These levers mount followers 50 which cooperate with the peripheries of cams 51 and 52. The latter conveniently are carried by and move with shaft 31. Springs 53 may serve to maintain followers 50 in cooperating engagement with the cam surfaces. Therefore, it will again be evident that as shaft 31 turns rods 44 and 46 will be projected and retracted to correspondingly move the registration structures associated therewith.

Figure 3:
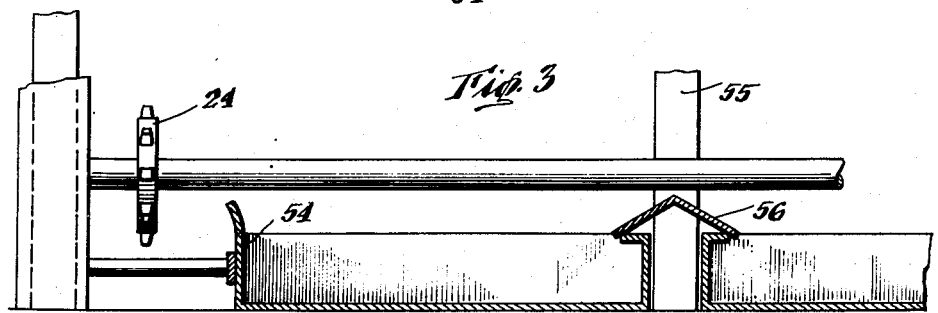
Fig. 3 is a fragmentary sectional front view of the lower portion of the assembly as shown in the preceding views.

As shown especially in Fig. 3, receptacles are conveniently disposed below the series of rods 30 to receive any displaced material. The receptacles may take the form of pans 54 extending through to the central support 55 of the machine and resting upon the floor or the base of that machine. In line with the central support 55 a diverting element 56 may be provided. Thus, any material falling downwardly below the conveyor belts 35 will come to rest within the pans 54. The latter may be periodically emptied and replaced.

In any event, considering the operation of the transfer mechanism it will be understood that at the entrance to the dryer or other unit from which conveyors 10 extend, bars 14 carrying the goods to be processed are associated with these conveyors and move with them throughout the dryer or similar unit. As the chains move downwardly from sprocket 11 they pass in the zone of the upward course of conveyor 16. At that point the parts are timed so that the bar, together with the goods supported thereby, is received by the transfer unit 20. Therefore it is freed from association with the conveyor 10 and now moves with the conveyor 16 as in Fig. 4. In its latter movement the goods and the bar move outwardly until the goods assumes a downwardly inclined position as shown in Fig. 5. At that time bar 14 will have been freed from notches 21 of the transfer member 20 and be retained by the latch elements 22. Still considering the movement of the bar it will be understood that with a proper timing of the parts the bar will now be transferred to conveyor 23 and be moved by the latter to, for example, the forward end of the dryer or other machine.

As the goods supported by the bar move outwardly with conveyor 16 from sprocket 18 towards sprocket 17 their rear ends will pass over the shield 41 of the registration plate or member 40 as in Fig. 6. In such passage the forwardly bent portion 41 of that member will, in effect, act as a pawl to prevent retrograde or return movement of the goods incident to frictional contact with the bar or otherwise. This will be apparent from an inspection of Fig. 2. Due to the fact that the vertical portion 40 and the outwardly extending portion 42 are preferably formed of corrugated material, the strands are prevented from displacing or scattering. In other words their relative alignment will be maintained. In any event, as the goods become supported upon the upper ends of rods 30 it is desirable that the several strands of the same be brought into registration. For this reason the parts are timed so that lever 47 will be moved by its cam to shift rod 44 to the left as viewed in Fig. 2. This will obviously shift the hook or crotch portion of the goods to the extreme left. As rod 44 returns to its initial position, the rear ends or legs of the goods clear the downwardly extending shield portion 42.

Thereafter, and due to the timing of the several cams, bars 28 will lower carrying with them the goods supported upon the horizontal portions of rods 30. This lowering will continue until the strands of macaroni or other goods rest upon the upper course of the conveyor provided by belts 35 as in Fig. 7. Again, at this time, it is desirable that the strands of the goods should be brought into proper registration with the several portions of the mechanism. To this end the cam which operates rods 46 has been disposed so that these rods will move to the left as viewed in Fig. 2, carrying with them the plate 45. The latter will engage the rear ends of the strands and serve to bring the hook portions thereof to a position adjacent the plate 38. In all instances that plate will prevent too great a shifting of the goods.

The drive controlling the operation of belts 35 may be governed in any desired manner automatically or otherwise, as taught in my earlier application. Likewise any suitable number of separate power sources or drives may be employed to assure a shifting of bars 28, rods 44 and rods 46. Additionally the several conveyors 10, 16 and 23 may be driven in any desired manner. Any desired number of rods 44 or 46 may be employed for properly supporting and shifting the parts connected with them. Also it will be understood that any suitable number of cams or other shifting means may connect with these rods.

Briefly recapitulating the operation of the machine with reference to the diagrammatic showings in Figs. 4 to 7 inclusive, it will be observed that in the first of these figures a bar carrying with it the processed goods is moving downwardly with conveyor 10. Rods 30 are lowered to their extreme position in which the goods carried by the horizontal portion of these rods is now supported by the conveyor embracing the belts 35. In Fig. 5 rods 30 have moved to their elevated position and the rear legs of the strands comprising the goods have moved into contact with the registration assembly including the plate 40. In that view it will also be observed that the bar 14 has been transferred to conveyor 23.

In Fig. 6 the registration unit including the plate 40 has been shifted by its rod 44 to the left thereby shifting the goods towards the shield or deflector plate 38. Therefore the goods will be in proper registration upon the rods 30. The latter will now lower to the position shown in Fig. 7. To again assure proper registration at this instant plate 45 will shift to the left to engage the rear ends of the goods and thus cause these ends to all be brought into alignment as they are transferred to the conveyor moving towards the packaging machinery. It will be observed as in Figs. 6 and 7 that the transfer member 20 has completed its cycle of operation and is now beginning to assume the position shown in Fig. 4 which may be considered the point at which the cycle is initiated. As will be understood rods 39 serve during the transfer operation to prevent a sidewise displacement of the goods.

Thus, among others, the several objects of the invention as specifically aforenoted are achieved. Obviously numerous changes in construction and rearrangement of the parts might be resorted to without departing from the spirit of the invention as defined by the claims.

I claim:

1. A transfer mechanism including in combination a conveyor to receive goods, means movable towards and away from said conveyor for lowering goods onto the surface of the latter, means receiving goods draped over a bar, means for removing the bar from association with said goods, means for transferring goods from said receiving means to said lowering means, means for assuring registration of the goods upon said lowering means, means for operating said last named means and pawl means forming a part of said receiving means and cooperating with said goods as it comes to rest upon said lowering means.

2. A transfer mechanism including in combination a conveyor to receive goods, means movable towards and away from said conveyor for lowering goods onto the surface of the latter, means receiving goods draped over a bar, means for removing the bar from association with said goods, means for transferring goods from said receiving means to said lowering means, movable means forming a part of said receiving means for assuring registration of the goods upon said lowering means, means for operating said last named means and further movable registration means cooperating with said goods as said lowering means transfers it to said conveyor.

3. A transfer mechanism including in combination a conveyor to receive goods, means movable towards and away from said conveyor for lowering goods onto the surface of the latter, means receiving goods draped over a bar, means for removing the bar from association with said goods, means for transferring goods from said receiving means to said lowering means, movable means forming a part of said receiving means for assuring registration of the goods upon said lowering means, means for operating said last named means, further registration means cooperating with said goods as said lowering means transfers it to said conveyor and operating means for said last named registration means.

4. A transfer mechanism including in combination a conveyor comprising a plurality of spaced belts, a lowering assembly including a plurality of spaced rods, means for supporting said rods to extend between said belts, means receiving material draped over a bar, means for removing the bar from association with said material, a movable registration means forming a part of said receiving means and disposed adjacent the upper zone of positioning of said rods and cooperable with the material supported thereby to dispose their material in pre-determined positions upon said rods and further movable registration means also disposed adjacent said conveyor and shiftable into engagement with the material as it is brought into supporting position upon said conveyor to again dispose the material in proper positions with respect to each other and said conveyor.

5. A transfer mechanism including in combination a conveyor to receive strand material, a support movable from an elevated position above said conveyor to a position adjacent the same at which latter position the material is transferred to said conveyor, means receiving material disposed over a bar, means for removing the bar from association with said material, means for thereupon delivering such material to said support when the latter is in elevated position, means forming a part of said receiving means for shifting the material into predetermined registration with respect to said support in such position of the latter and means for lowering the support to a position at which the material is transferred to said conveyor.

6. A transfer mechanism including in combination a conveyor to receive strand material, a support movable from an elevated position above said conveyor to a position adjacent the same at which latter position the material is transferred to said conveyor, means receiving material disposed over a bar, means for removing the bar from association with said material, means for thereupon delivering such material to said support when the latter is in elevated position, means forming a part of said receiving means for shifting the material into predetermined registration with respect to said support in such position of the latter, means for lowering the support to a position at which the material is transferred to said conveyor and further means for then shifting said material to have the latter assume a position of registration with respect to said conveyor.

7. A transfer mechanism including in combination a conveyor to receive strand material, a support movable from an elevated position above said conveyor to a position adjacent the same at which latter position the material is transferred to said conveyor, means receiving material disposed over a bar, means for removing the bar from association with said material, means for thereupon delivering such material to said support when the latter is in elevated position, means forming a part of said receiving means for shifting the material into predetermined registration with respect to said support in such position of the latter, means for lowering the support to a position at which the material is transferred to said conveyor and means for preventing the shifting of said material upon said support while the latter is in elevated position and after the transfer of the material thereto.

8. A transfer mechanism including in combination a plurality of spaced members providing in aggregate a support for strand material, means for elevating and lowering said support, means receiving material draped over a bar, means for removing the bar from association with said material means for thereupon delivering such material to said support when the latter is in elevated position, a registration assembly forming a part of said receiving means over which said material passes in such delivery and means for shifting said assembly to assure such registration during the final stage of the delivery.

9. A transfer mechanism including in combination a plurality of spaced members providing in aggregate a support for strand material, means for elevating and lowering said support, means for delivering such material to said support when the latter is in elevated position, a registration plate over which said material passes in such delivery, means for shifting said plate to assure such registration during the final stage of the delivery and pawl means forming a part of said plate to prevent the movement of material away from the same.

10. A transfer mechanism to be disposed adjacent the delivery end of a conveyor, provided with spaced supports to receive a bar between them, said mechanism comprising in combination a support to receive goods mounted by said bar, means for shifting said support, a conveyor to receive goods from said support upon the latter being so shifted and bar engaging and feeding means operatively connected to said mechanism to function prior to the shifting of said support for moving the bar out of operative association with said goods.

11. A transfer mechanism including in combination a pivotally mounted lever, a support comprising spaced bars carried by said lever, a conveyor having parts arranged between said bars, means for lowering said lever to a point at which said bars extend below said conveyor, movable rod engaging means forming a part of said mechanism for moving goods supported by rods in operative association with said bars and further movable means for shifting said rods out of contact with the goods upon the latter being associated with said bars.

12. A transfer mechanism including in combination a main conveyor comprising portions to support between them a bar over which strands of material are hung, means for guiding a part of said conveyor in a generally downward direction, a second conveyor, means for guiding said second conveyor to move in a generally upward direction and adjacent said part of the first-named conveyor, bar-supporting means carried by said second conveyor to intercept and transfer bars and material carried thereby to said second conveyor in the zone in which said conveyors move adjacent each other, a third conveyor receiving and supporting bars delivered by said second conveyor and means for removing the material from the bars as the latter are supported by said third conveyor.

13. A transfer mechanism including in combination a main conveyor comprising portions to support between them a bar over which strands of material are hung, means for guiding a part of said conveyor in a generally downward direction, a second conveyor, means for guiding said second conveyor to move in a generally upward direction and adjacent said part of the first-named conveyor, bar-supporting means carried by said second conveyor to intercept and transfer bars and material carried thereby to said second conveyor in the zone in which said conveyors move adjacent each other, a third conveyor having a part to move adjacent a portion of said second conveyor and to receive bars delivered therefrom and a support adjacent said second conveyor to be engaged by and to receive material as the bar carrying the latter is moved by said second conveyor.

14. A transfer mechanism including in combination a main conveyor comprising portions to support between them a bar over which strands of material are hung, means for guiding a part of said conveyor in a generally downward direction, a second conveyor, means for guiding said second conveyor to move in a generally upward direction and adjacent said part of the first-named conveyor, bar-supporting means carried by said second conveyor to intercept and transfer bars and material carried thereby to said second conveyor in the zone in which said conveyors move adjacent each other, a third conveyor having a part to move adjacent a portion of said second conveyor and to receive bars delivered therefrom, a support adjacent said second conveyor to be engaged by and to receive material as the bar carrying the latter is moved by said second conveyor and means cooperating with the supported material to retain the latter substantially against movement as the bar is moved by said third conveyor.

15. A transfer mechanism including in combination a main conveyor comprising portions to support between them a bar over which strands of material are hung, means for guiding a part of said conveyor in a generally downward direction, a second conveyor, means for guiding said second conveyor to move in a generally upward direction and adjacent said part of the first-named conveyor, bar-supporting means carried by said second conveyor to intercept and transfer bars and material carried thereby to said second conveyor in the zone in which said conveyors move adjacent each other, a third conveyor having a part to move adjacent a portion of said second conveyor and to receive bars delivered therefrom, a support adjacent said second conveyor to be engaged by and to receive material as the bar carrying the latter is moved by said second conveyor, means cooperating with the supported material to retain the latter substantially against movement as the bar is moved by said third conveyor, a fourth conveyor and means to move said support to deposit the material thereon upon said fourth conveyor.

16. A transfer mechanism including in combination a main conveyor comprising portions to support between them a bar over which strands of material are hung, means for guiding a part of said conveyor in a generally downward direction, a second conveyor, means for guiding said second conveyor to move in a generally upward direction and adjacent said part of the first-named conveyor, bar-supporting means carried by said second conveyor to intercept and transfer bars and material carried thereby to said second conveyor in the zone in which said conveyors move adjacent each other, a third conveyor having a part to move adjacent a portion of said second conveyor and to receive bars delivered therefrom, a support adjacent said second conveyor to be engaged by and to receive material as the bar carrying the latter is moved by said second conveyor, means cooperating with the supported material to retain the latter substantially against movement as the bar is moved by said third conveyor, a fourth conveyor, means to move said support to deposit the material thereon upon said fourth conveyor and means for assuring an alignment of the material upon said latter conveyor.

References Cited in the file of this patent

UNITED STATES PATENTS

| Number | Name | Date |
| --- | --- | --- |
| 770,486 | White | Sept. 20, 1904 |
| 1,318,910 | Pfohl | Oct. 14, 1919 |
| 1,569,033 | Reichel | Jan. 12, 1926 |
| 1,837,607 | Biggert | Dec. 22, 1931 |